United States Patent Office 3,294,061
Patented Dec. 27, 1966

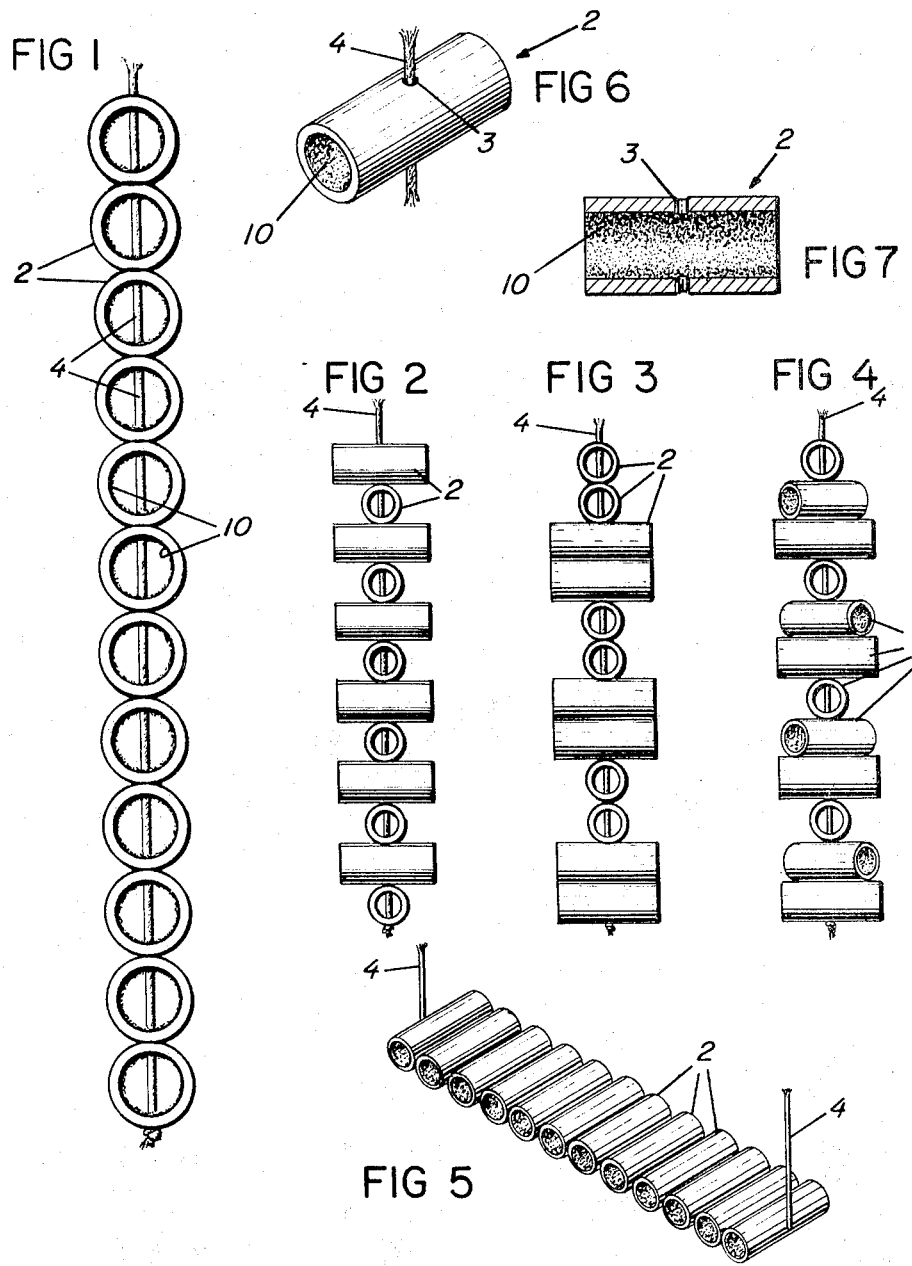

3,294,061
APPARATUS FOR GROWING OYSTERS
FROM SPAT
Fletcher Hanks, 22 Port St., Easton, Md. 21601
Filed Aug. 27, 1965, Ser. No. 483,152
3 Claims. (Cl. 119—4)

This invention relates to the cultivation of oysters and more particularly to the modification or control of the natural growth thereof.

The spawn or larvae of the oyster, which is frequently referred to as spat, attaches itself to stones, old shells of oysters, etc., and will cling thereto until the soft shell forms and the young oyster seed are created.

The underwater surface of the material to which the spat attaches itself is known as culch, or cultch; and if too freely exposed, such as when lying on the bottom, makes the oyster set vulnerable to attack by numerous underwater enemies such as starfish, crabs, drumfish, drills, etc. Also, it is sometimes smothered by shifting bottoms.

In the past there have been a number of proposals for improving culch and accessability to the oysters growing therefrom; some of which include suspended strings or the like carrying enlarged culch members or areas. Such suspension of the culch desirably maintains it in spaced relationship with respect to the bottom of the waterway or oyster grounds, and therefore free from attack by drills, starfish and other crawling enemies. However, the spat is still readily accessible to drumfish, crabs, etc.

Among the objects of the present invention is to consistently obtain oysters which are closely uniform in size and shape.

Another object is to control oyster growth and the direction it takes by the provision of improved culch means, said means being such as will not only elevate the culch out of contact with the bottom of the waterway, but will shield it to an appreciable extent from natural enemies which are not confined to crawling. When so elevated there is more available food for the oysters whereby they grow faster and stay healthier and fatter.

Another object is to permit the growth of the oyster to maturity from a relatively small and easily handled housing which has open ends and which is suspended in the oyster-growing water on a rope, wire or string. After the oysters have attained proper size, the housing may be removed from the water and the grown oysters quickly and easily harvested, thus reducing harvesting labor to a minimum.

Still another object of the invention is to provide an apparatus which will permit the unitary transfer of a large number of growing oysters from one location to another location where growing conditions and flavor conditions are more favorable.

A further object is to provide an apparatus or device of the class described which will efficiently operate in the manner aforesaid and which, at the same time, is cheap and easy to manufacture and very durable in service.

The foregoing and other objects and advantages of the invention will be more fully understood after referring to the following description taken in conjunction with the accompanying drawings, in which:

FIGURE 1 is an elevational view illustrating a device which embodies the teachings of the present invention;

FIGURES 2, 3 and 4 are views which are similar to the showing of FIGURE 1 but which illustrate various modifications;

FIGURE 5 is a perspective view illustrating a further modification;

FIGURE 6 is a perspective illustrating a single tubular culch housing member, as will be described hereinafter;

FIGURE 7 is a longitudinal sectional view of the single tubular culch housing member of FIGURE 6.

Referring more particularly to the drawings, the numeral 2 generally designates the culch supporting and growth controlling element of the invention, the same comprising a plurality or series of horizontally extending foreshortened tubes which are in superposed relationship.

The foreshortened tubes 2 are preferably, but not necessarily, round in cross-section.

According to one form or embodiment of the present invention, the plurality or series of foreshortened tubes 2 may be transversely apertured, as at 3, and suspended on a wire, rope or string 4 which is threaded therethrough and secured in suitable fashion to the bottom or lowermost tube. When so suspended the superposed foreshortened tubes 2 may be disposed to occupy a common vertical plane as shown in FIGURE 1.

Another embodiment comprises the arrangement of the superposed foreshortened tubes 2 at alternate 90 degree angles, as illustrated in FIGURE 2.

Other embodiments include various other angular arrangements, as represented in FIGURES 3 and 4.

In FIGURE 5 a series or group of foreshortened tubes 2 is disposed in parallelism and secured together as a unit adapted for horizontal disposition and suspension. Such a series or group of parallel foreshortened tubes 2 may be superposed on similar groups or series and in the same or different angular disposition with respect to the vertical.

The foreshortened tubes may vary in number but in any event provide tubular compartments of the same general size and configuration.

The interior surface of each of the foreshortened tubes 2, particularly adjacent the ends thereof, are roughened as indicated at 10; thus rendering these areas conducive to the catching of the spat and the setting of the oyster resulting therefrom. In this manner any oyster is made to grow horizontally outward from a horizontally extending and initially sheltered area in each of the tubular compartments.

The remainder of the foreshortened tubes 2 are smooth or unroughened, thereby reducing to a minimum tendency of the spat to attach itself thereto.

In operation, a plurality of devices foreshortened tubes 2 of the type described, say a dozen or more in number, are threaded onto a suitable rope, wire or cord 4 which passes through the transverse apertures 3 thereof.

All of the elements of the device, including the foreshortened tubes 2 and the rope, wire, or cord 4 may be made of any suitable, durable material, including various plastics, so that they can be used repeatedly after removing the oysters at maturity.

While the diameter of the interior of the foreshortened tube 2 may vary, it should be of a size suitable to catch and protect young oysters and direct their growth outwardly therefrom.

Oyster growing houses or containers of the construction described assure the growing of a close assemblage of oysters of uniform size and shape, and this is particularly appealing to the half-shell or raw oyster trade wherein usually lots of six to twelve are served on a plate.

These oysters of assuredly uniform size and shape can be more readily shucked by machinery than wild oysters of varying shapes.

By growing oysters in the manner described the meat withdraws from the end of the oyster leaving the hinge so that the hinge-end can be mechanically sawed off without cutting the oyster meat, thereby leaving an opening between the two shells for the easy entry of a mechanically operated blade to shuck or cut the adductor muscle from the shell.

Having thus described the invention, what I claim as new and desire to secure by Letters Patent is:

I claim:

1. Apparatus for growing oysters comprising a cylindrical housing adapted to be submerged in a body of oyster-growing water; said housing having a relatively smooth outer surface and having a series of substantially horizontally extending tubular recesses; at least a portion of the sidewall of each of said recess having a rough surface for the attachment thereto of oyster spat.

2. Apparatus for growing oysters comprising a cylindrical housing adapted to be submerged in a body of oyster-growing water; said housing being relatively smooth on the outside and having a plurality of outwardly opening recesses extending in a substantially horizontal direction; at least a portion of each recess having a rough surface for the attachment thereto of oyster spat.

3. An apparatus for growing oysters from spat comprising a housing adapted to be submerged in a body of oyster growing water comprising a plurality of relatively short tubular housings of a size adapted to receive spat therein, mounted through intermediate transverse holes serially on a flexible suspension means, said tubular housings being smooth on the outer surfaces and rough on the inner surfaces whereby the spat will settle on only the sheltered inner surface to grow and mature into oysters.

References Cited by the Examiner

UNITED STATES PATENTS

| 2,853,049 | 9/1958 | Glancy | 119—4 |
| 3,017,857 | 1/1962 | Munz | 119—4 |

FOREIGN PATENTS

| 1,184,250 | 2/1959 | France. |
| 1,360,273 | 3/1964 | France. |
| 3,506 | 10/1875 | Great Britain. |

SAMUEL KOREN, *Primary Examiner.*

ALDRICH F. MEDBERY, *Examiner.*